United States Patent [19]

Moriki et al.

[11] Patent Number: 4,543,818
[45] Date of Patent: Oct. 1, 1985

[54] SEAL CHECK APPARATUS FOR LUBRICANT-ENCLOSURE TYPE TRACK JOINTS OF TRACK CHAINS

[75] Inventors: Yasumitsu Moriki, Tokyo; Tadashi Sato, Sagamihara; Kazuyoshi Yamamoto, Ibaraki; Izumi Takahashi, Hasuta, all of Japan

[73] Assignee: Maruma Jyusharyo Kabushiki Kaisha, Tokyo, Japan

[21] Appl. No.: 467,797

[22] Filed: Feb. 18, 1983

[30] Foreign Application Priority Data

Sep. 9, 1982 [JP] Japan ................... 57-155806

[51] Int. Cl.⁴ ............................................. G01M 3/28
[52] U.S. Cl. ..................................... 73/49.8; 29/407; 59/5
[58] Field of Search ......................... 73/40, 49.8; 59/5; 29/407; 277/2

[56] References Cited

U.S. PATENT DOCUMENTS 4,250,740 2/1981 Wagner et al. ................. 73/49.8 X Primary Examiner—Jerry W. Myracle
Assistant Examiner—Joseph W. Roskos
Attorney, Agent, or Firm—Robert E. Burns; Emmanuel J. Lobato; Bruce L. Adams

[57] ABSTRACT

This seal check apparatus is mounted on a track press and checks the airtightness of a track joint immediately after the completion of assembly of a track chain using the track press. The apparatus comprises a base assembly mounted on the track press; a vacuum head which is engageable with and disengageable from the track joint on the track press; a member provided with freedom of displacement on the base assembly and supporting the vacuum head with freedom of displacement; a first actuating member provided on the base assembly and displacing the vacuum head supporting member; a second actuating member provided on the vacuum head supporting member and displacing the vacuum head; a gas system for sucking gases from the vacuum head when the latter engages the track joint; and a control member for controlling the operations of both actuating members and the gas system.

11 Claims, 9 Drawing Figures

SEAL CHECK APPARATUS FOR LUBRICANT-ENCLOSURE TYPE TRACK JOINTS OF TRACK CHAINS

BACKGROUND OF THE INVENTION

This invention relates to a seal check apparatus for lubricant-enclosure type track joints of track chains, which are used widely in construction machinery and the like.

The lubricant-enclosure type track joint to be checked by this invention is disclosed hereinafter. A desired length of track chain can be obtained by fitting a pair of inner links and a pair of outer links on a track joint comprising a track pin and a track bushing fitted on the track pin. In the track pin is a lubricant reservoir 16 comprising a blind hole with an inlet port one end. The reservoir communicates with the boundary surface between the track pin and the track bushing through a radial lubricant passage through the wall of the track pin. Seal members prevent the leakage of the lubricant between the track pin and the track bushing to the outside.

Track chain as mentioned above have hitherto been assembled by the use of a track press. Accordingly, this assembling method will be briefly explained.

In the track press part of links are assembled with a track joint. A succeeding track joint is mounted on a jaw and adapters, which have been retracted up to now, cooperate to press succeeding links from right and left onto a pair of track joints, thereby to assemble a pair of track joints and a pair of track links completely; Then the respective adapters retract.

According to the dimensions of the machinery to which the track chain is attached, the length of its track pin and links varies, and as a matter of course, the pitch between the respective track joints and the pitch between the respective links vary, too. In these circumstances, measures are taken to change the positions of the jaws, the positions of the adapters the travelling strokes of the adapters.

Thereafter, lubricant is supplied through the inlet port into the lubricant reservoir of the thus assembled track chain by means of an oil charging device, and then the port is blocked with a plug. Thus, the track chain is ready for use.

In a track chain of this type, it is necessary to prevent leakage of the oil for lubricating the boundary surface between the outer surface of to the outside through the seal members.

In view of this, an airtight checking operation in commonly done before the oil is supplied. Recently, this checking operation been carried out while the track chain is still on the track press. When the checking operation proves that the seal is good, guide plates remove the track chain from the jaws. The track chain continues to advance until a succeeding track joint is positioned to receice links, and then stops. Thereafter, the guide plates descend to their original positions. Thereafter, this sequence is repeated.

In contrast thereto, when the checking operation proves that the sealing state is no good the, adapters are actuated to remove the defective track joint from the links for disassembling the track chain in the reverse of the above mentioned sequence, the inferior part is replaced with a new one, and then the track chain is assembled again.

The aforesaid checking operation has been done in such a manner that an operator utilizes a manual checking unit due to the absence of an automatic checking unit and works it by hand ever time a pair of links are assembled. However, this checking operation is defective in that it is complicated and takes a long period of time, whereby the work efficiency is exceedingly low, and further in that it hinders the possibility of attaining a uniform and reliable checking result because every operator has his own different working manner.

SUMMARY OF THE INVENTION

It is an object of this invention to provide a seal check apparatus which is capable of eliminating the various drawbacks inherent in the above mentioned conventional checking operation; is mounted on the track press so that the checking operation may be achieved automatically immediately after the completion of the track assembly; and thus is capable of obtaining a uniform and reliable checking result.

This object is achieved by apparatus according to this invention. That is, this check apparatus comprises a base assembly mounted on a track press used; a vacuum head engageable with and disengageable from to a track joint; means on the base assembly movable supporting the vacuum head with freedom of displacement; first actuating means on the base assembly for displacing the vacuum head supporting means; second actuating means on the vacuum head supporting means for displacing the vacuum head; a pneumatic system for sucking air from the vacuum head; and control means for controlling the operations of the first and second actuating means and the pneumatic system.

It is another object of this invention to provide a seal check apparatus which is capable of changing the position of the vacuum head in concert with the length and pitch of the track joint to thereby maintain the positional relation between the vacuum head and the track joint always accurately.

This object is achieved by virtue of the fact that the base assembly is mounted on the track press with freedom of movement in the same direction as the direction of movement of the track chain and in the direction perpendicular thereto.

It is a further object of this invention to provide a seal check apparatus wherein the vacuum head, which engages and disengages the track joint, can be easily displaced to a position in which it does not disturb the operations of the track press, except during the seal check operation.

This object is achieved by virtue of the fact that the vacuum head supporting means comprises a horizontal arm mounted with freedom of horizontal rotation on the base assembly and a vertical arm provided with freedom of oscillation in the direction perpendicular to said horizontal arm, and the arms are designed to be actuated by an actuating member comprising a force pressed gas system.

DETAILED DESCRIPTION OF THE INVENTION

Figure 1:
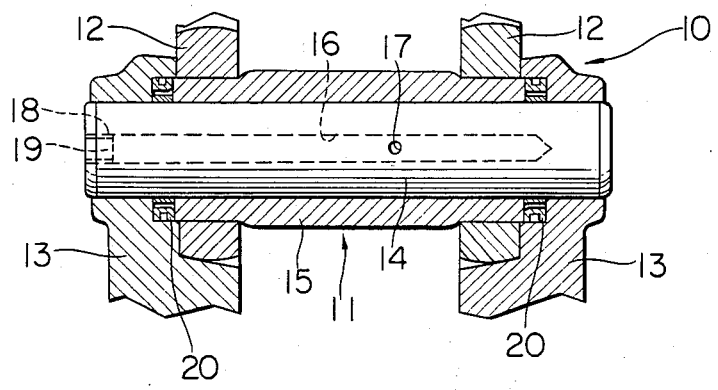
FIG. 1 is a sectional view of the track joint portion of the track chain whose sealing is checked according to this invention.
Figure 2:
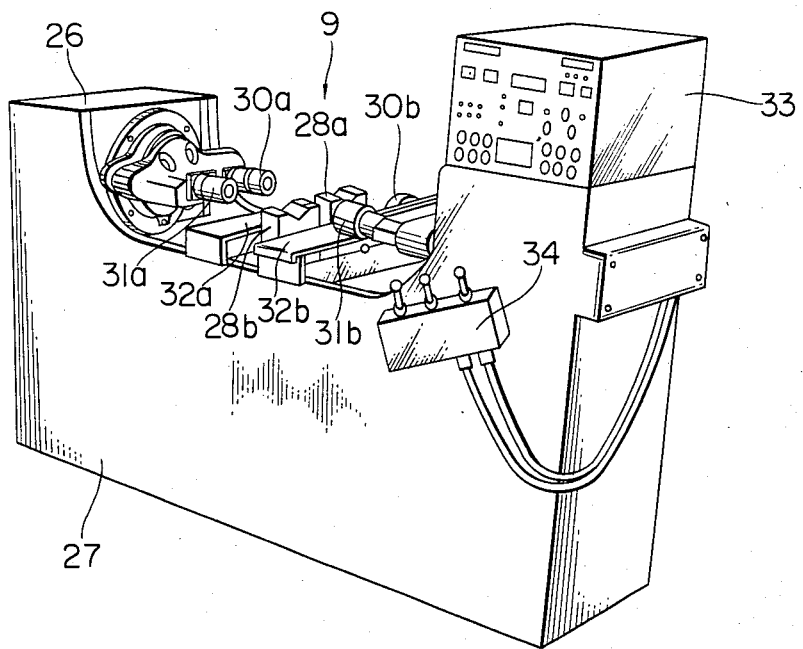
FIG. 2 is a perspective view of the hitherto used track press with which the track chain illustrated in FIG. 1 is assembled and to which the seal check apparatus of this invention is attached.

FIG. 4 to FIG. 7 show the a preferred embodiment of a seal check apparatus 1 according to this invention.

This check apparatus 1 includes a cross member 2 attached to an upper surface 26 of a main frame on one side of a track press 9; a main arm 3 provided movable in the same direction as the direction of movement of a track chain 10 and movable in the direction perpendicular thereto; a horizontal rotating mechanism 5 adjacent to the fore end of the main arm 3 and supporting a horizontal arm 4 which is rotatable in the horizontal direction; a checking mechanism 8 comprising a generally vertical arm 6 supported oscillatably in the direction perpendicular to said arm 4 and a vacuum head 7 disposed at the lower end of the vertical arm 6; and a pneumatic control unit for actuating the rotating mechanism 5 and the checking mechanism 8.

On the cross member 2 there is provided a slide base 41. which is attached a slider 44 which advances or retreats in relation to the working part of the press 9 by the operation of a handle 42. To a slide base 46 provided on the slider 44 there is attached a slider 45 which moves in the direction perpendicular to the direction of movement of the slider 44 by the operation of a handle 43. To the upper part of the slider 45 there is fixed the base end of the main arm 3 projecting toward the working part of the press 9.

Figure 5:
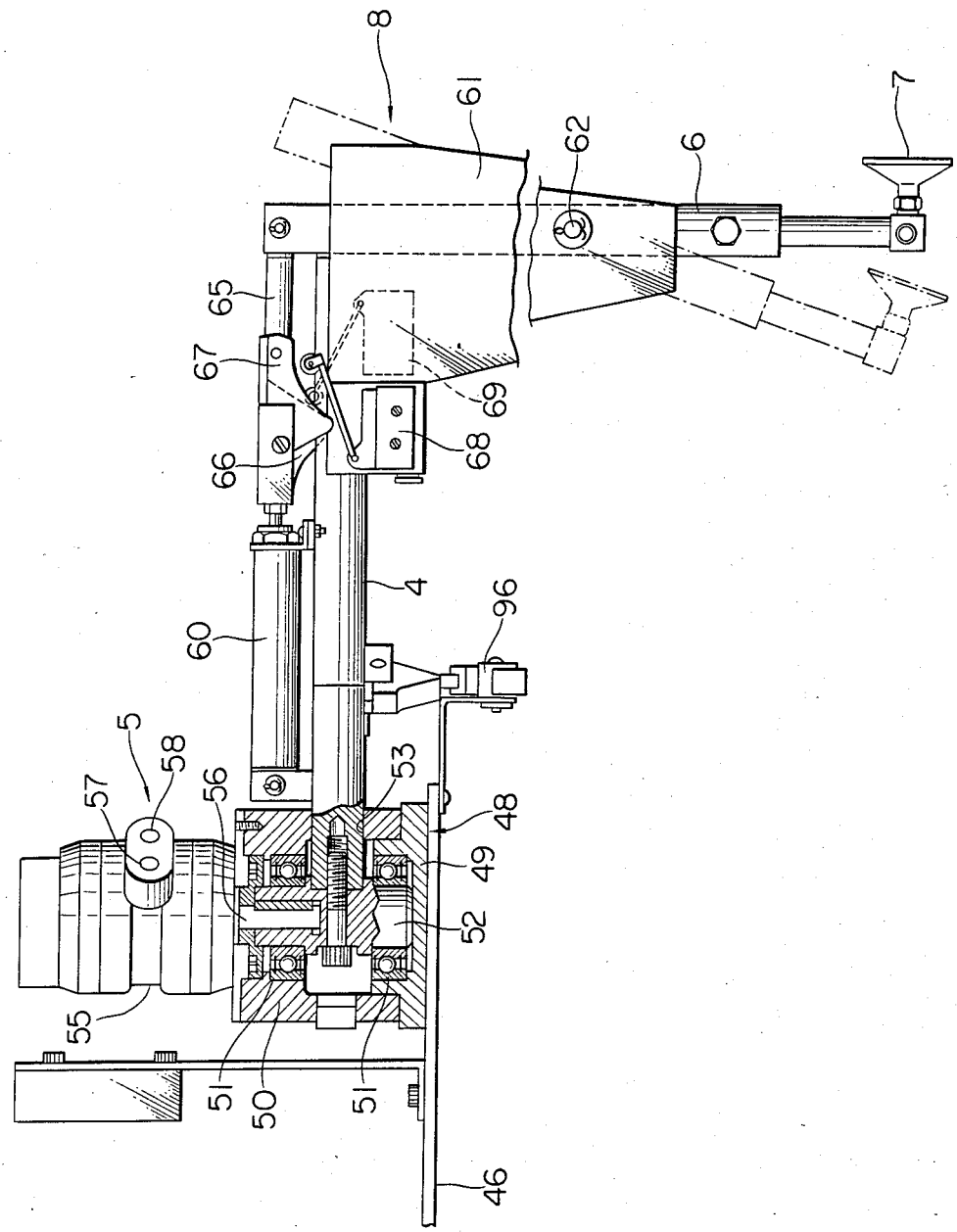
FIG. 5 is a partially enlarged and partially cutaway view of FIG. 4.
Figure 6:
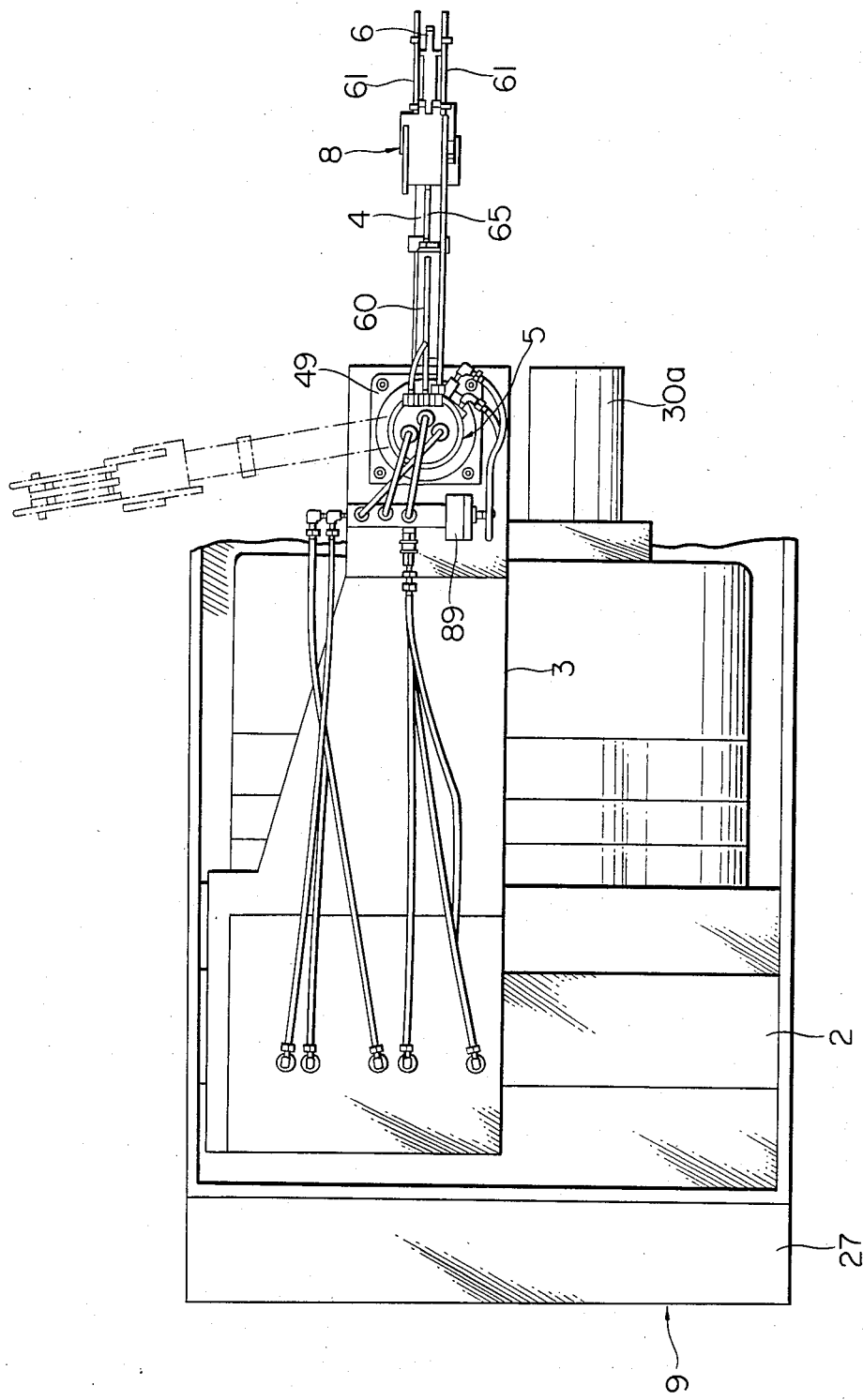
FIG. 6 is a plan view of the seal check apparatus illustrated in FIG. 4.

On the fore end of the main arm 3 there is fixed a base assembly 48 which comprises a base plate 49 and a cylindrical post 50 as best shown in FIG. 5. Within base assembly 48 upper and lower portions of a vertical shaft 52 are rotatably supported by two bearings 51. The base end of the horizontal arm 4 is fixed to shaft 52. Arm 4 projects to the outside from a horizontal hole through the peripheral wall of a cylindrical post 50.

A rotating actuator 55 best seen in FIG. 5, is provided on the base assembly 48. Actuator 55 is hollow and the lower end of its actuating shaft 56 projects out of the actuator 55 and is coupled with the vertical shaft 52. To the actuating shaft 56 within the hollow part of the actuator 55 wind blades (not shown) are fixed, and injection of air through port 57 or port 58 in the peripheral wall of the actuator 55 by means of these wing blades permits the actuating shaft 56 to rotate clockwise or counterclockwise through a range of about 100°.

In the checking mechanism 8, a pair of hanging supporting plates 61 are provided at the fore end of the horizontal arm 4, the vertical arm 6 is attached with freedom of oscillation to said supporting plates 61 by a pivot pin 62, and a vacuum head 7 is fixed to the lower end of the arm 6. The fore end of a piston rod 65 of an air cylinder 60 provided on the arm 4 is hinge-coupled with the upper end of the arm 6. The piston rod 65 is provided with two kinds of hanging cams 66 and 67. And, to the arm 4 there are attached switches 68 and 69 which are actuated by these cams 66 and 67.

One example of the circuit for the pneumatic control unit which actuates the above mentioned horizontal rotating mechanism 5 and checking mechanism 8 will be explained with reference to FIG. 8.

This pneumatic control unit can be roughly divided into a compressed air system for the actuator 55 of the horizontal rotating mechanism 5 and the air cylinder 60 of the checking mechanism 8, and a vacuum system for the vacuum head 7 of the checking mechanism 8.

Figure 8:
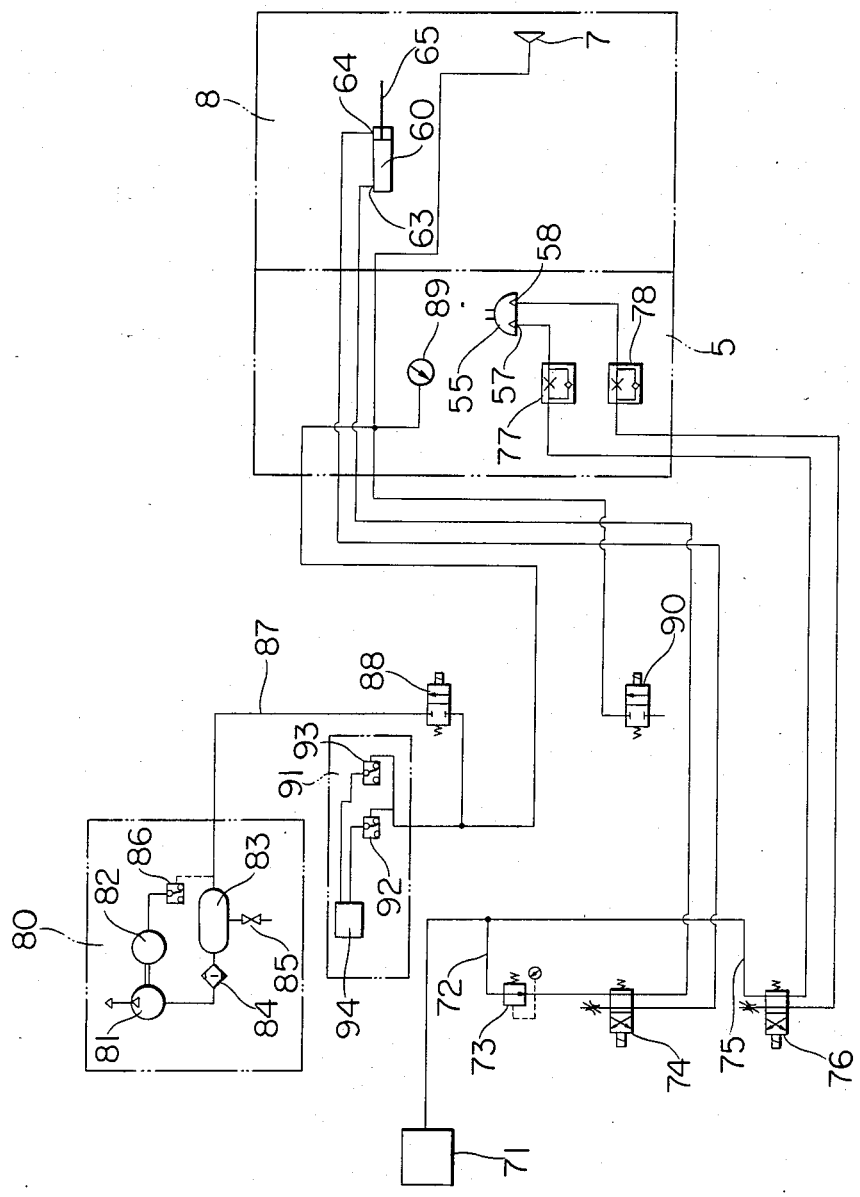
FIG. 8 is a control gas circuit diagram of the embodiment illustrated in FIG. 4.

In FIG. 8, reference numeral 71 denotes a compressed air source for the compressed air system. Air pressure of about 6–7 kg/cm$^2$ is supplied from this source. Its one piping 72 has communication with an air port 63 or 64 of the air cylinder 60 through a regulator 73 and a solenoid valve 74, and the other piping 75 has communication with an air port 57 or 58 of the actuator 55 through a solenoid valve 76 and a speed control valve 77 or 78.

Reference numeral 80 denotes a vacuum source for the vacuum system, and reference numeral 81 denotes a vacuum pump worked by electric motor 82. The pump 81 sucks air from a vacuum tank 83 having a drain valve 85 through a filter 84. Reference numeral 86 denotes a vacuum switch which detects the degree of vacuum in the system. The switch 86 controls the motor 82 so that the degree of vacuum in the tank 83 may be held substantially constant.

A piping 87 from the tank 83 passes through a solenoid valve 88 and is connected with the vacuum head 7, and in between there are a vacuum gauge 89, a solenoid valve 90 which communicates with the atmosphere and a checking circuit 91. The checking circuit 91 includes upper and lower vacuum pressure limit switches 92 and 93 for determining the range being checked and a checking unit 94 for inputting the output of the switches 92 and 93 during the time determined by a timer or the like, normally for 5–10 seconds. The checking operation is achieved by the checking circuit 91 in the manner described hereinafter.

The operation of the checking apparatus. 1 will now be explained with adapters 30a, 31a and +b, 31b retracted, as shown on the right side of FIG. 3B, relative to the track chain 10 assembled on the track press 9 the track joint 11 mounted on the jaw 28a is seal-checked by the seal check apparatus 1 in the gap between the adapter 30a on the left side and the track pin 14.

As this seal checking operation is effected by abutting the vacuum head 7 against the inlet port 18 of the track pin 14 as referred to afterwards, it is required prior to the assembly to regulate the positional relation between the vacuum head 7 and the track pin 14 so that the vacuum head 7 may be confronted precisely with the track pin 14 by working the handle 42 and 43 and moving the slider 44 and 45. During this assembly, the arm 4 for supporting the vacuum head 7 is rotated to the position as shown by broken lines in FIG. 6 so as not to interfere with the assembly operation.

When the adapters reach their retracted positions after the track chain 10 has been assembled, the solenoid valve 76 (FIG. 8) is actuated for supplying compressed air to the air port 58 of the rotating mechanism 5, simultaneously communicating the air port 57 with the atmosphere. When the arm 4 is rotated clockwise to the position shown in solid lines in FIG. 6, owing to this air supply, it is stopped there by the action of solenoid valve 76. At this position, the vacuum head 7 confronts the inlet port 18 of the track pin 14 and retracts as shown by solid lines in FIG. 4 and by broken lines in FIG. 5.

Thereafter, the solenoid valve 74 is actuated for supplying compressed air to the port 64 of the air cylinder 60 and simultaneously communicates the air port 63 with the atmosphere. When the vertical arm 6 is oscillated counterclockwise owing to this air supply and reaches the position shown with solid lines in FIG. 5, the switch 69 is operated by the action of the cam 66 to stop the arm 6 at that position. At this position the vacuum head 7 is in close contact with the inlet port 18 of the track pin 14.

Thereafter, the solenoid valve 88 is actuated for communicating the vacuum head 7, vacuum gauge 89 and checking circuit 91 with the vacuum tank 83 and simultaneously closing the solenoid valve 90. Thus, the air present between the reservoir 16 and lubricant passage 17 of the track pin 14 and the seal members 20 is sucked in by the vacuum head 7. And, when the vacuum pressure is elevated by this suction and reaches the set pressure (normally, 710 mmHg) of the upper limit switch 92, the vacuum switch 86 is turned off and the sucking operation is discontinued. If the vacuum pressure does not thereupon go down to a set pressure (normally, 680 mmHg) of the lower limit switch 93 after the lapse of a fixed period of time (about 5–10 seconds), the switch 93 is not actuated and therefore there is no input to a checking unit 94. This state shows that the sealed condition is good. Accordingly, the checking unit 94 gives an order to proceed to the succeeding step.

This order permits the solenoid valve 88 to restore its original position and simultaneously opens the solenoid valve 90 thereby to discontinue the suction of the vacuum head 7.

In succession, the solenoid valve 74 restores its original position for supplying compressed air to the port 63 of the air cylinder 60 and simultaneously communicates the air port 64 with the atmosphere. When this air supply oscillates the arm 6 clockwise in FIG. 5 and separates the vacuum head 7 from the track pin 14 for restoring the position shown in broken lines, the cam 67 is operated and thus the switch 68 is actuated so as to bring the arm 6 to a standstill there.

Figure 7:
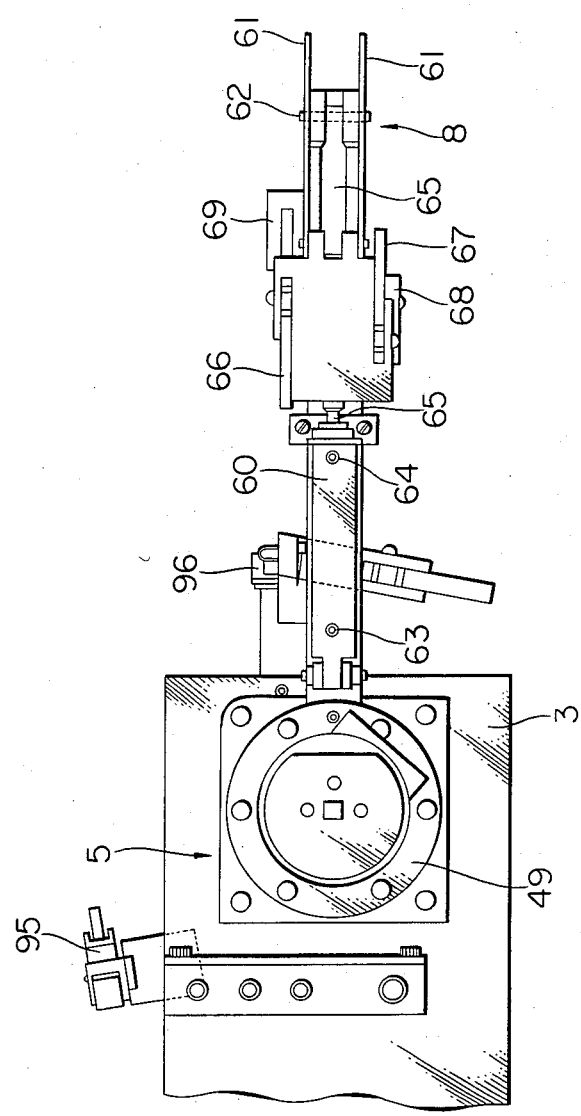
FIG. 7 is an enlarged view of a portion of FIG. 6.

Then, the solenoid valve 76 restores its original position, thereby supplying compressed air to the air port 57 of the rotating mechanism 5 and communicating the air port 58 with the atmosphere at the same time. When this air supply rotates the arm 4 counterclockwise up to the position shown in broken lines in FIG. 6, the pin 96 comes to engage the switch 95 (FIG. 7). Thus, the switch 95 is actuated and consequently the solenoid valve 76 is operated so as to bring the arm 4 to a halt there. The rotating speed of the rotating mechanism 5 is controlled by means of speed control valves 77 and 78.

Figure 3A:
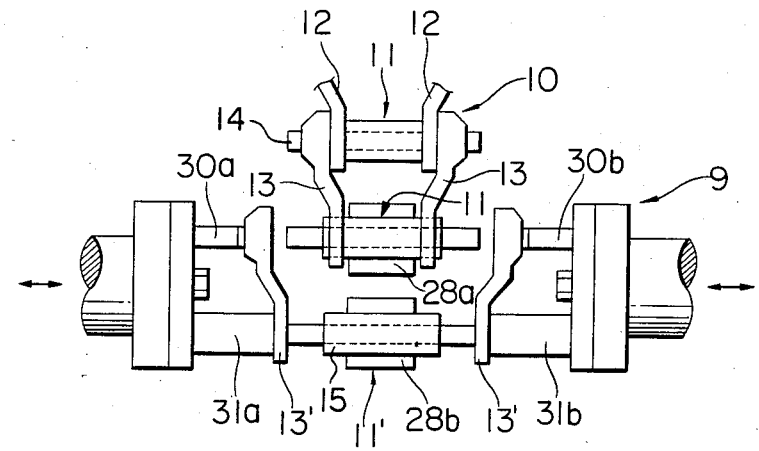
FIG. 3A illustrates the first half of the process of assembling the track chain by means of the track press shown in FIG. 2.
Figure 3B:
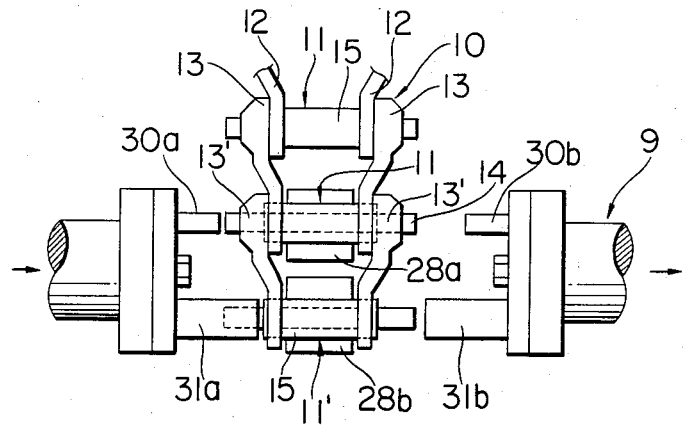
FIG. 3B illustrates the second half of the assembling process.
Figure 4:
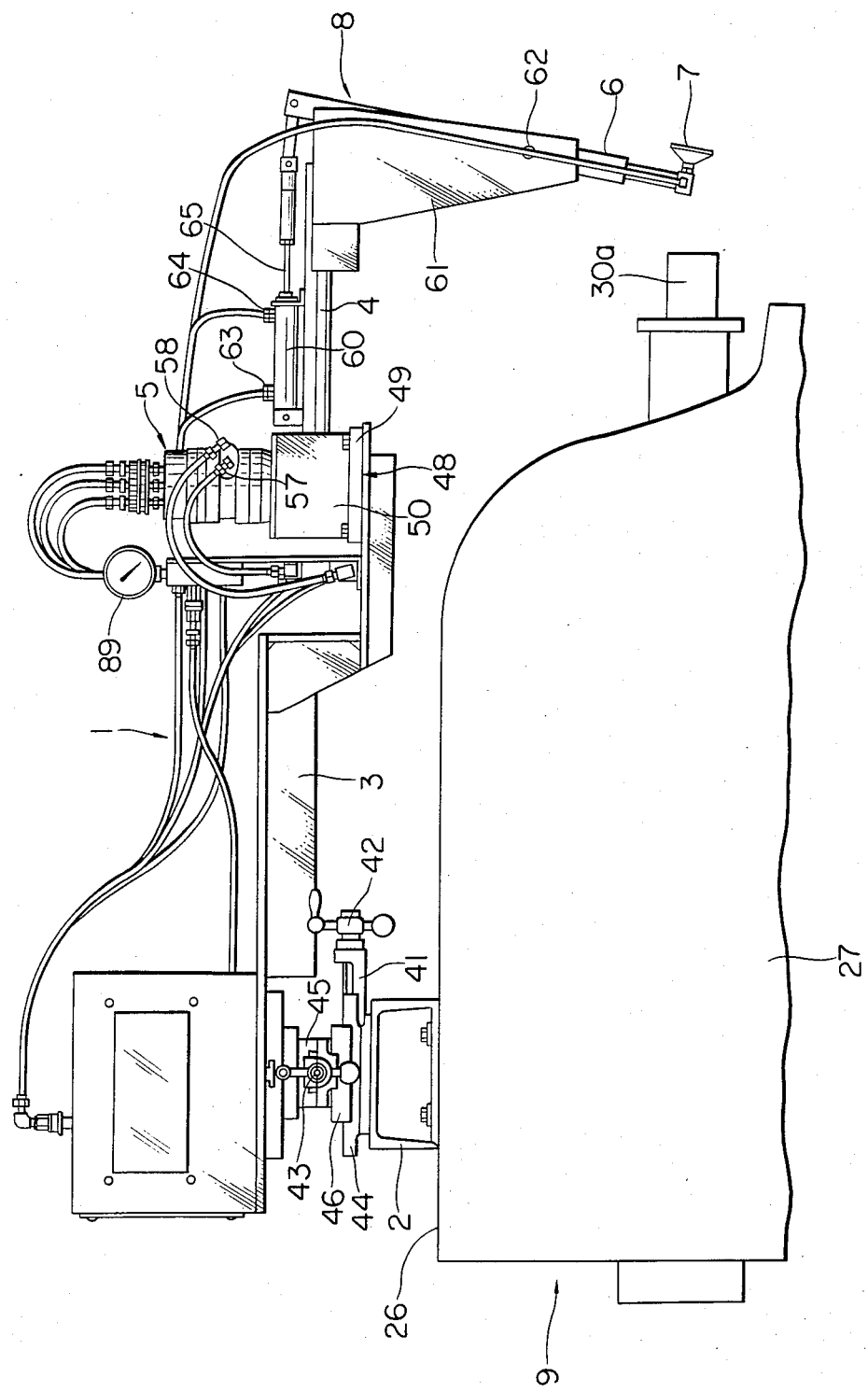
FIG. 4 is an elevational view of a seal check apparatus according to this invention.

Thereafter, guide plates 32a and 32b ascend for receiving the track chain 10 on their upper surfaces from the jaws 28a and 28b, further advance forward horizontally (upwards in FIG. 3B), while maintaining this state, until a succeeding track joint 11' gets on the grooved part of the jaw 28a, then stops for delivering the track chain 10 to a receiving member (not shown), and thereafter descend so as to mount the succeeding track joint 11' on the grooved part of the jaw 28a, resulting in the state as shown in the upper part of FIG. 3A. Thereafter, a desired length of track chain may be formed by repeating the above mentioned sequence.

On the other hand, if, upon discontinuance of the sucking operation, the vacuum pressure lowers below the set pressure of the lower limit switch 93 within the fixed time, the switch 93 is actuated to turn on the checking unit 94. This state shows that the sealed condition is no good. At this time, the checking unit 94 lights a red lamp (not shown) and blows a warning device (not shown) to.

Thereafter, the arm 4 is allowed to restore its original position shown in broken lines in FIG. 5 in the same manner as mentioned above, and then the adapters 30a, 31a, 30b, and 31b advance, in place of the guide plates 32a and 32b, for removing the track joint 11 from the link 13' and disassembling the track chain 10 for the purpose of exchanging the defective part of the track joint 11 and/or seal member 20. Then, the track chain 10 is re-assembled in the same manner as aforesaid. and, the checking operation is carried out again.

The assembling and disassembling operations as aforesaid are all designed to be done automatically by an electric control circuit. This control circuit is in a control box 33. In addition to this automatic controller, there is provided a controller 34 which permits manual control.

In the disclosed embodiment, the horizontal and vertical movement of the vacuum head 7 is achieved by rotating the horizontal arm 4 by the horizontal rotating mechanism 5 and oscillating the vertical arm 6 by the cylinder 60. However, it may be achieved otherwise, namely, by moving the horizontal arm 4 vertically without rotating it or moving the vertical arm 6 horizontally without oscillating it.

What is claimed is:

1. A seal check apparatus for a lubricant-enclosure type track joint of a track chain comprising a base assembly mounted on a track press used for assembling said track chain; a vacuum head engageable with and disengageable from said track joint; means on said base assembly supporting said vacuum head; first actuating means on said base assembly for displacing said vacuum head supporting means; second actuating means on said vacuum head supporting means for displacing said vacuum head; a pneumatic system for sucking gas from said vacuum head; and control means for controlling the operations of said first and second actuating means and said pneumatic system.

2. A seal check apparatus according to claim 1 wherein said base assembly is provided on the track press with freedom of movement in the same direction as that of the track chain and in the direction perpendicular thereto.

3. A seal check apparatus according to claim 1 wherein said vacuum head supporting means comprises a horizontal arm member provided rotatably horizontally relative to the base assembly and a vertical arm member provided with freedom of perpendicular oscillation relative to said horiztonal arm member.

4. A seal check apparatus according to claim 3 wherein said first and second actuating means include a compressed air system which operates said horizontal arm member and said vertical arm member.

5. A seal check apparatus according to claim 4 wherein said control means comprises an electric circuit which secures the control of sequence and controls solenoid valves incorporated in said first and second actuating means and said pneumatic system.

6. Apparatus for checking a sealed joint in a device having an inlet port, said apparatus comprising: a vacuum head sealingly engageable with said port, a pneumatic system for sucking gas from said head with said head engaging said port to create a vacuum pressure within said device and to elevate the value of the vacuum pressure to a predetermined maximum value, means for determining when the vacuum pressure attains said predetermined maximum value, means for thereupon discontinuing the sucking operation with said head still engaging said port, and means for determining whether or not the value of the vacuum pressure decreases to a predetermined minimum value during a predetermined time interval after discontinuance of the sucking operation, with said head still engaging said port.

7. Apparatus according to claim 6; wherein said means for determining when the value of the vacuum pressure attains said maximum value includes an upper limit switch.

8. Apparatus according to claim 6; wherein said means for discontinuing the sucking operation includes a vacuum switch.

9. Apparatus according to claim 6; wherein said means for determining whether or not the value of the vacuum pressure decreases to the minimum value is a lower limit switch.

10. Apparatus according to claim 6; wherein said joint is a lubricant-enclosure track joint of a track chain and includes a bushing having an internal surface, a pin rotatably engaging said internal surface and spaced seal members sealing the space between said pin and said internal surface, said pin having a reservoir communicating with said inlet port and with said space between said seal members, and said apparatus further comprises a base assembly mountable on a press for assembling said track chain, and means on said base assembly for moving said head into and out of engagement with said inlet port without removing said track chain from said press.

11. A method of checking a sealed joint in a device having an inlet port, said method comprising the steps of: sealingly engaging a vacuum head with said port; thereafter sucking gas from said head to create a vacuum pressure in said device and to elevate the value of said vacuum pressure to a predetermined maximum value; thereafter discontinuing said sucking step and then determining whether or not the value of said vacuum pressure decreases to a predetermined minimum value during a predetermined time interval after discontinuance of said sucking step; and then removing said head from engagement with said port; whereby said joint can be judged acceptable if the value of said vacuum pressure remained above said predetermined minimum value at the end of said time interval.

* * * * *